United States Patent [19]

Piche

[11] Patent Number: 5,478,031
[45] Date of Patent: Dec. 26, 1995

[54] AIRSPEED CONTROL SYSTEM WHICH UTILIZES PITCH HOLD COMMAND WHEN PILOT THROTTLE CHANGES OPPOSE ELEVATOR CONTROL

[75] Inventor: William A. Piche, Marion, Iowa

[73] Assignee: Rockwell International Corporation, Seal Beach, Calif.

[21] Appl. No.: 128,510

[22] Filed: Sep. 29, 1993

[51] Int. Cl.⁶ .................................................. B64C 13/18
[52] U.S. Cl. ........................................................ 244/195
[58] Field of Search ........................... 244/76 R, 182, 244/194, 195

[56] References Cited

U.S. PATENT DOCUMENTS

| | | | |
|---|---|---|---|
| 4,471,439 | 9/1984 | Robbins et al. | 244/182 |
| 4,536,843 | 8/1985 | Lambregts | 244/182 |
| 4,764,872 | 8/1988 | Miller | 244/182 |
| 5,079,711 | 1/1992 | Lambregts et al. | 244/182 |

*Primary Examiner*—Galen L. Barefoot
*Attorney, Agent, or Firm*—Gregory G. Williams; M. Lee Murrah; George A. Montayne

[57] ABSTRACT

An improved autopilot system of the type which uses pitch commands to control airspeed with an improvement of including a temporary pitch hold command being issued if thrust changes would oppose the autopilot pitch command. The temporary pitch hold command would end when the airspeed reaches a calculated airspeed capture point.

5 Claims, 3 Drawing Sheets

5,478,031

AIRSPEED CONTROL SYSTEM WHICH UTILIZES PITCH HOLD COMMAND WHEN PILOT THROTTLE CHANGES OPPOSE ELEVATOR CONTROL

FIELD OF THE INVENTION

The present invention generally relates to aircraft autopilots, and more particularly concerns autopilots for general aviation aircraft of the type not typically having autothrottles.

BACKGROUND OF THE INVENTION

In the aviation industry, large commercial jetliners in the air transport market typically have both autopilot and autothrottle systems thereon to aid a pilot in controlling the speed and attitude of the aircraft. In smaller, general aviation aircraft, such as business jets and commuter planes, typically there is no autothrottle system. The pilot is left with the task of manually making all throttle or thrust adjustments. However, general aviation autopilots have typically used elevator adjustments, commanded by the autopilot, to control airspeed. While this approach has been used widely in the past, it does have some drawbacks when the pilot induced throttle changes oppose the autopilot elevator control.

When a pilot selects a higher desired airspeed the autopilot may pitch the aircraft down to gain more speed. If the pilot increases the throttle setting to attain the higher airspeed and causes a rate-of-change of airspeed which exceeds the rate limit set by the autopilot, the autopilot may command a pitch-up to reduce the rate-of-change of airspeed. The result is that the aircraft makes large undesirable pitch attitude excursions and takes longer to reach the desired airspeed. A similar problem exists when a pilot wishes to simultaneously descend and reduce airspeed, and reduce thrust.

Consequently, there exists a need for improved autopilot systems which do not exhibit the undesirable pitch attitude excursions.

SUMMARY OF THE INVENTION

It is an object of the present invention to provide an autopilot system with enhanced pitch attitude control.

It is a feature of the present invention to include a pitch attitude hold command and airspeed capture point computation during airspeed acquisition and flight level change maneuvers.

It is an advantage of the present invention to command pitch changes in airspeed acquisition maneuvers.

The present invention provides an improved autopilot system which is designed to satisfy the aforementioned needs, produce the earlier propounded objects, include the above described features, and achieve the already articulated advantages. The invention is carried out in a "rollercoasterless" approach in the sense that the typical up-pitches followed by down-pitches, in a climb and accelerate maneuver, are eliminated. Instead, a pitch-hold command is temporarily utilized until a calculated airspeed capture point is reached. This eliminates the autopilot up-down-pitch command and the unwanted "rollercoaster" effect.

Accordingly, the present invention provides an autopilot system for controlling the pitch of an aircraft that utilizes, in some circumstances, a temporary pitch-hold command when both desired airspeed and manual throttle settings are changed.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE DRAWINGS

Now referring to the Figures where like numerals refer to like matter and text throughout.

Figure 1:
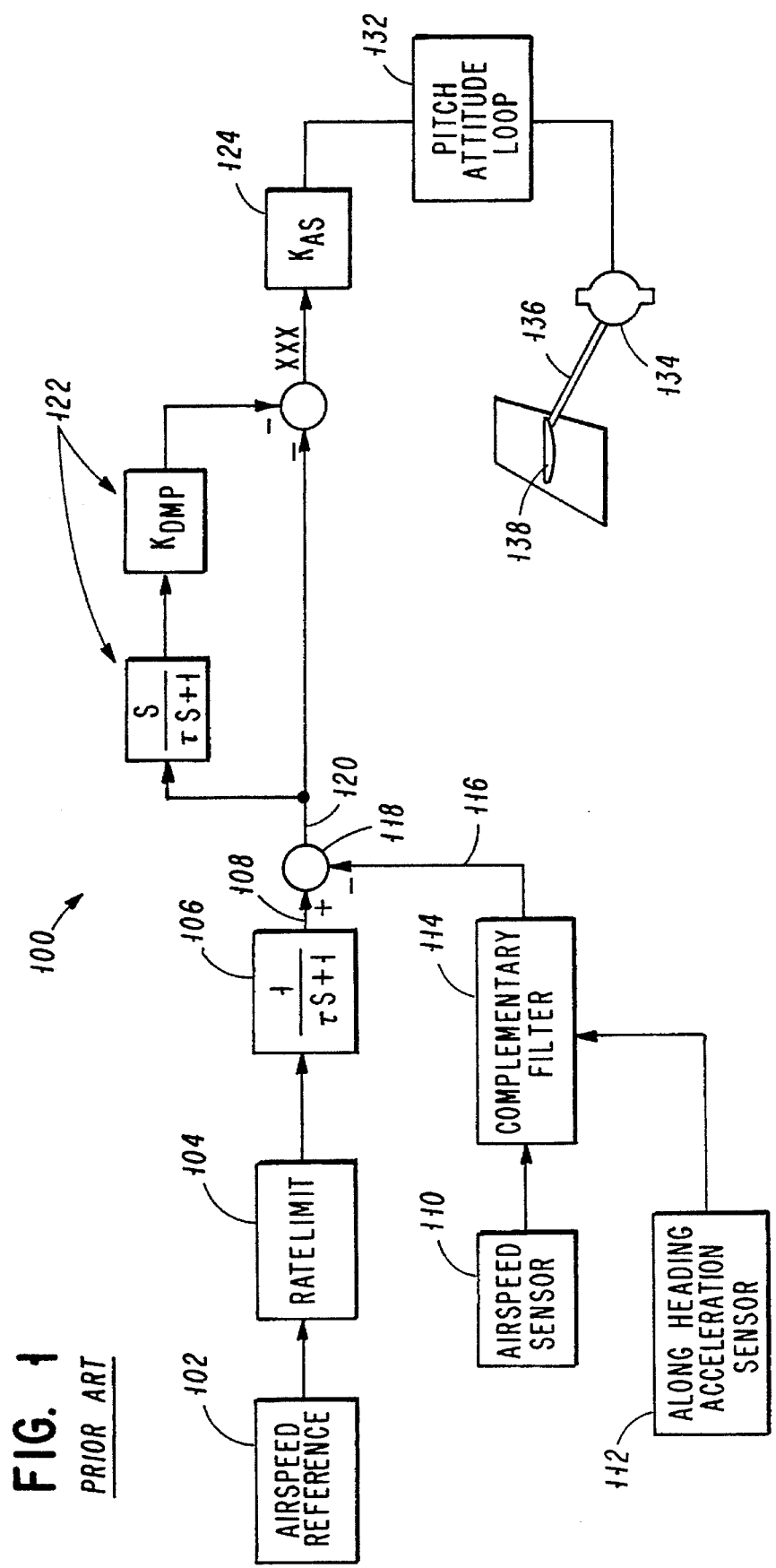
FIG. 1 is a control circuit diagram, of the prior art.

Now referring to FIG. 1, there is schematically shown the airspeed control law for a prior art autopilot system which is generally designated 100. This autopilot system 100 is designed to manipulate the orientation of the aircraft elevator 138, which is coupled with drive servo 134 by mechanical linkage 136. The operation of drive servo 134 is affected by signals received from sensors or controllers located elsewhere in the aircraft, such as airspeed sensors, AHRS, and autopilot input commands. Typically, the autopilot system 100 is performed by an on-board flight control computer configured to implement the control laws. However, it is possible to utilize a combination of individual circuit elements to construct a hardware system customized for such an application.

In more detail, the system 100 operates as follows: an airspeed reference 102, which is typically a numbered dial disposed in the cockpit for generating airspeed reference signals as commanded by the pilot, which is coupled to a rate limit 104 which typically forms the function of limiting the rate-of-change of airspeed to a certain predetermined limit which is a function of the particular aircraft. This rate limited signal then is delayed by lowpass smoothing filter 106 which imparts a lag into the signal. The rate limited and time lagged airspeed reference signal is then provided on line 108. Also included is an airspeed sensor 110 for sensing the actual airspeed of the aircraft, and additionally there is included an along heading acceleration sensor 112 for sensing the actual along heading acceleration of the aircraft. Outputs from sensors 110 and 112 are combined at complementary filter 114 and then provided along line 116 to summer 118 where an error signal representing the difference between the signals on line 108 and 116 is provided on line 120. The error signal on line 120 is sent through damping circuit 122 and is added to the error signal which is XXX. This is converted to an autopilot pitch command by constant 124 which creates a predetermined degree of pitch for a predetermined airspeed error signal. This pitch command is provided to a pitch attitude loop 132 which outputs a servo command to drive servo 134. Drive servo 134 is connected to mechanical linkage 136 which is coupled to the aircraft elevator 138.

Figure 2:
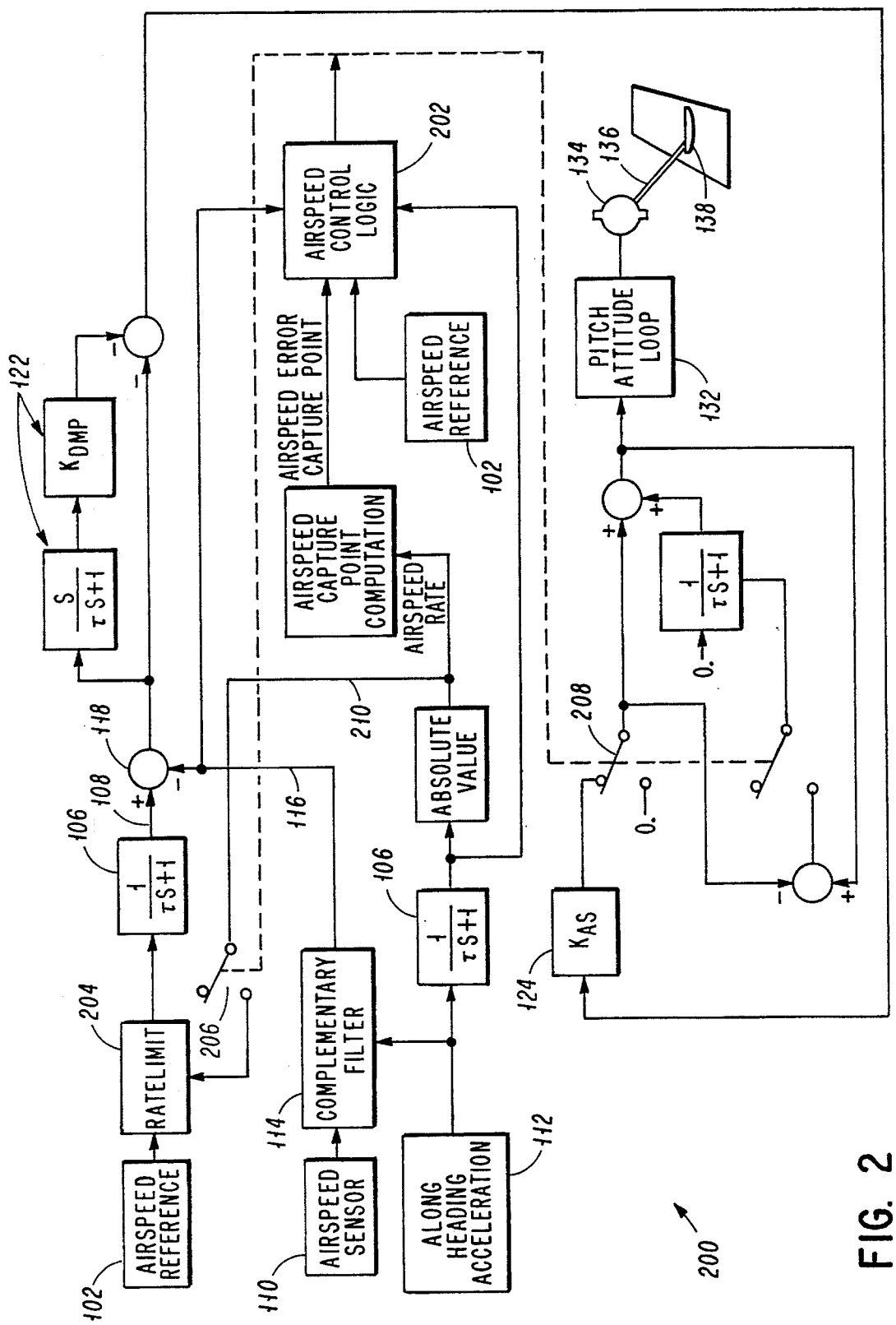
FIG. 2 is a control circuit diagram of the present invention, which includes a switch for temporarily setting the pitch command to zero.

Now referring to FIG. 2 there is shown an improved airspeed control system, of the present invention, generally designated 200 which includes much of the airspeed control system of the prior art of FIG. 1 and numerous additional and substitute structure and function. The improved system 200 includes airspeed control logic 202 which monitors the airspeed reference, the airspeed rate, and the current airspeed. The airspeed control logic 202 determines if the aircraft is above or below the current airspeed. The airspeed control logic 202 also determines if a large change in thrust will oppose the autopilot elevator control and controls switch 206 and switch 208 so that switch 206 is caused to be closed and switch 208 is caused to be opened. The closing of switch 206 provides the ability for the pilot to override the present rate limit, of the prior art systems, and allows the airspeed rate on line 210 to be used as the rate limit value for 204. The rate limit 204 typically has a predetermined rate limit for the aircraft therein much like rate limit 104, of the prior art, but additionally will give priority to and will allow the airspeed rate signal on line 210 to control if switch 206 is closed. The switch 208 is switched to the opened position and consequently the airspeed control system pitch command to the pitch attitude control is set to zero. This essentially results in a pitch-hold command. The switches 206 and 208 will be held in the closed and opened positions, respectively, until the airspeed control logic 202 determines that the actual airspeed 110 has reached a computed airspeed capture point. The airspeed capture point computation is a function of the airspeed rate on line 210. A higher airspeed rate will result in a larger difference between the airspeed capture point and the airspeed reference of 102. When the airspeed 110 reaches the airspeed capture point, the airspeed control logic 202 switches the switches 206 and 208 to open and closed positions, respectively. This allows the airspeed control system to issue pitch commands to control airspeed in a fashion that is very similar to the prior art system of 100.

In operation, the system 200 of the present invention reduces the "rollercoaster" effect that might normally occur when a pilot might simultaneously make an airspeed reference change and a throttle position change, if the pilot was flying an aircraft utilizing a system 100 of the prior art. The system 200 generally provides for a pitch-hold command during circumstances when the pilot's throttle change would normally dictate a result different than the prior art autopilot 100. The pitch-hold command is continued until the airspeed 110 has reached a computed airspeed capture point at which time the pitch-hold command is removed and the pitch control is returned to the normal airspeed pitch control command system.

Figure 3:
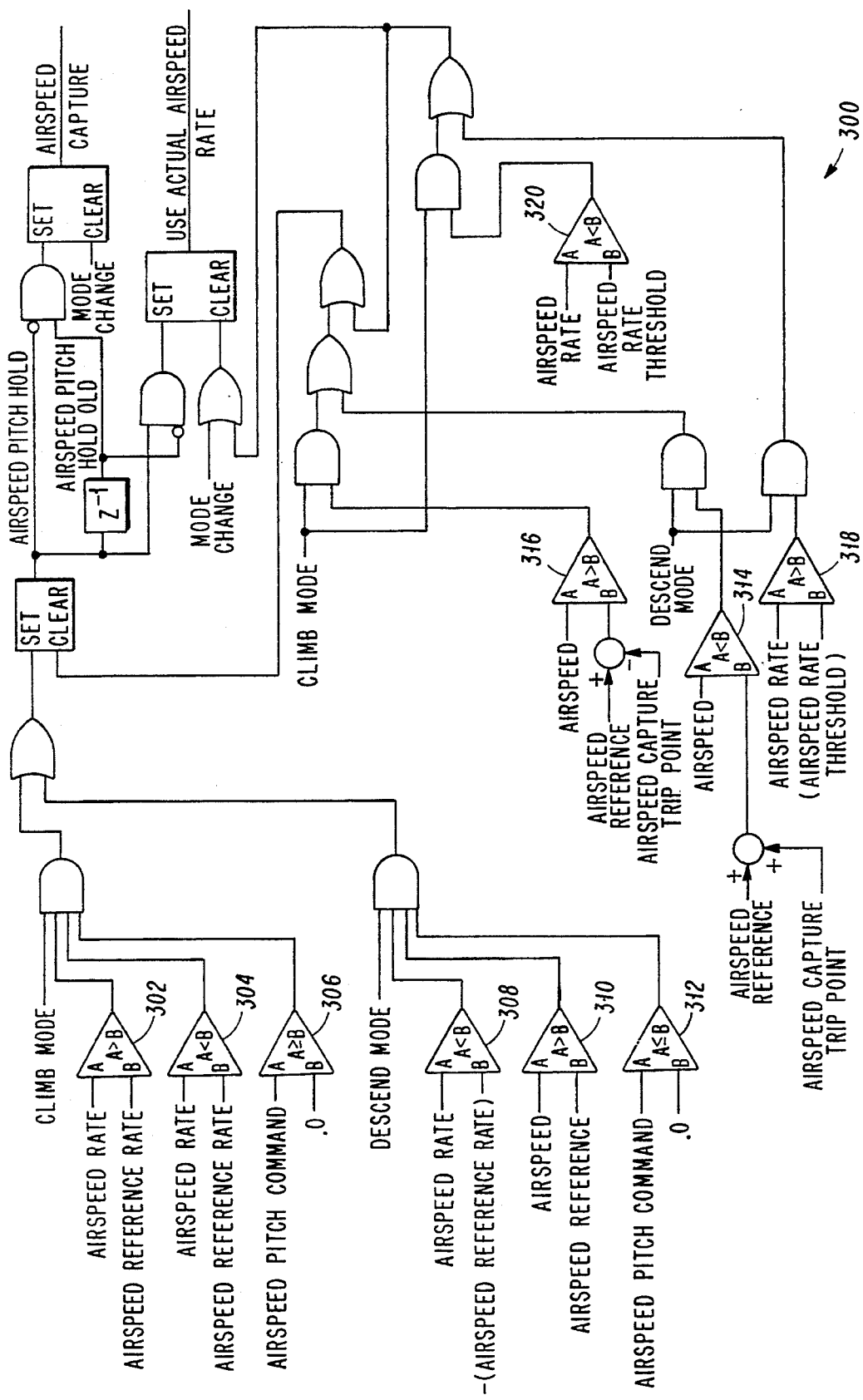
FIG. 3 is a logic diagram of the airspeed control logic 202 of FIG. 2.

Now referring to FIG. 3, there is shown a logic diagram, generally designated 300, of a preferred embodiment of the airspeed control logic 202 of FIG. 2. Comparators 302, 304, 306, 308, 310, 312, 314, 316, 318 and 320 are all devices for generating a digital signal in response to a comparison of two inputs which may be linear. The remainder of the logic diagram 300 is digital in nature and in accordance with conventional digital logic diagram drawing practices. The overall result of circuit 300 is a determination of when the pitch hold command is issued,(i.e. when to use the actual airspeed rate and when switch 208 (FIG. 2) is open). Additionally, a determination of when airspeed capture occurs (i.e. predetermined airspeed rate limits are used instead of actual airspeed rate, thus pitch hold command is released and switch 208 (FIG. 2) is closed). Other control logic schemes may be used which result in the described operation.

It is thought that the airspeed control system, of the present invention, and many of its attendant advantages will be understood from the foregoing description, and it will be apparent that various changes may be made in the form, construction, and arrangement of the parts and steps thereof without departing from the spirit and scope of the invention or sacrificing all of their material advantages, the form herein described being merely being a preferred or exemplary embodiment thereof.

I claim:

1. An autopilot system, for controlling the airspeed of an aircraft; the system comprising:

means for determining a current airspeed;

means for determining an airspeed reference;

means for determining an airspeed rate;

means for determining if a manual throttle setting change would oppose an autopilot elevator control command; and, means for temporarily holding an autopilot elevator control command when a manual throttle setting change would oppose an autopilot elevator control command.

2. A system of claim 1 further comprising:

means for calculating an airspeed capture point in response to the airspeed rate; and, means for reinstating autopilot elevator control commands when the current airspeed equals the airspeed capture point.

3. A method of reducing undesirable pitch attitude excursions comprising the steps of:

monitoring an airspeed;

monitoring an airspeed reference;

monitoring an airspeed rate;

comparing the airspeed and the airspeed reference and determining if airspeed reference is above the airspeed;

determining if a change in manual throttle setting would oppose an autopilot elevator control command; and, temporarily holding all autopilot elevator control commands at a fixed position when a manual throttle setting change would oppose the autopilot elevator control command.

4. The method of claim 3 further comprising the steps of:

calculating an airspeed capture point; and, releasing the holding of autopilot elevator control commands, when the airspeed reaches the airspeed capture point.

5. An airspeed control system comprising:

an airspeed sensor, for determining the current airspeed of an aircraft;

an airspeed rate sensor for determining the current rate of change of airspeed;

an airspeed reference controller for allowing the pilot to the set the desired airspeed;

means for issuing elevator control commands as an attempt to control airspeed;

means for monitoring the airspeed sensor, the airspeed rate sensor and the current rate of change of airspeed and determining if a manual throttle setting change would oppose an elevator control command; and, means for switching the means for issuing elevator control commands to a static position.

* * * * *